No. 632,940. Patented Sept. 12, 1899.
E. HENRIQUEZ.
ACETYLENE GAS GENERATING APPARATUS.
(Application filed Jan. 18, 1899.)
(No Model.)

Witnesses:
Jeanne Grimme
Charles Grimme

Inventor:
Edward Henriquez

UNITED STATES PATENT OFFICE.

EDOUARD HENRIQUEZ, OF BRUSSELS, BELGIUM.

ACETYLENE-GAS-GENERATING APPARATUS.

SPECIFICATION forming part of Letters Patent No. 632,940, dated September 12, 1899.

Application filed January 18, 1899. Serial No. 702,514. (No model.)

*To all whom it may concern:*

Be it known that I, EDOUARD HENRIQUEZ, a citizen of Curaçoa, Dutch West Indies, residing at Brussels, in the Kingdom of Belgium, have invented certain new and useful Improvements in Acetylene-Generating Apparatus, of which the following is a specification.

This invention relates to apparatus for generating acetylene from calcic carbid, and more specifically to that class of such apparatus in which the supply of water to the carbid for generating the gas is regulated by the pressure of the gas itself and an excess of gas over that required is caused to shut off the further supply of water, so that gas is not again generated until the normal pressure is reached.

The invention consists in certain details of construction and combinations of parts to be more fully described hereinafter and finally pointed out in the claims.

Figure 1:
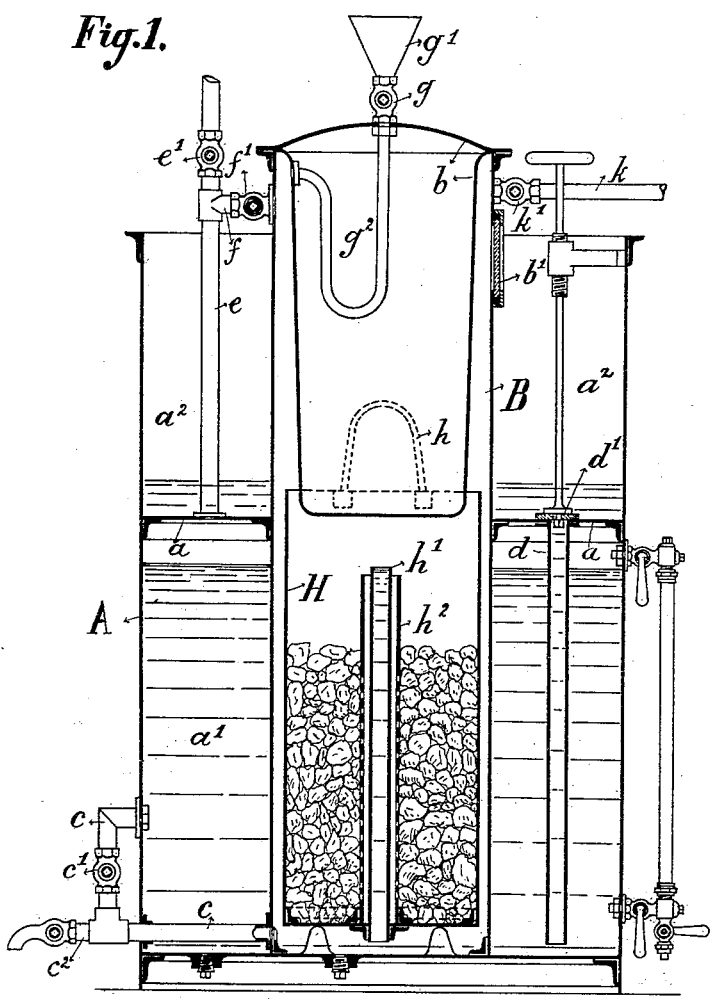
Figure 2:
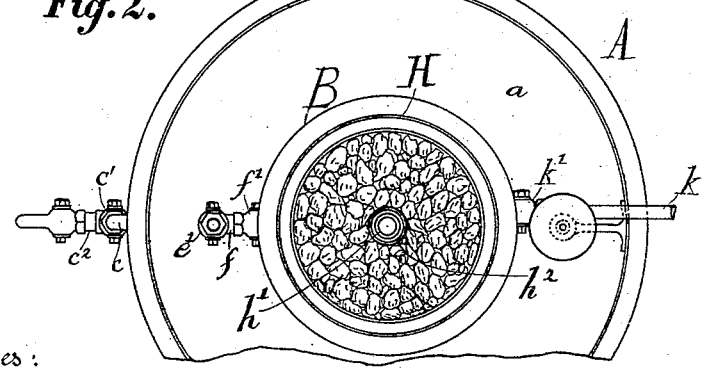

In the accompanying drawings, Figure 1 is a vertical central section through my improved apparatus, and Fig. 2 is a top view of the same with the cover removed.

Similar letters of reference indicate corresponding parts.

The improved apparatus consists of a water-tank A, having a central well B and divided outside of said central well by a partition-plate $a$ into a lower gas-tight annular compartment $a'$ and an upper annular compartment $a^2$, which may be open to the air, as shown in Fig. 1. From the lower portion of the compartment $a'$ a pipe $c$, provided with an exterior cock $c'$, leads to the inside of the well B, a branch pipe $c^2$, provided with a cock, being arranged on the pipe $c$, so that by properly opening or closing the cock $c'$ and the cock of the branch pipe $c^2$ water may be drawn off from either the well B or compartment $a'$ into a drain or suitable receptacle. The partition-plate $a$ supports a pipe $d$, which extends nearly to the bottom of the compartment $a'$ and is open at its upper end to the compartment $a$. A valve $d'$ is carried at the end of a suitable operating-rod and serves to open or close the upper end of the pipe $d$. The operating-rod extends upward from the valve, as shown in the drawings, and is supported in a screw-bearing of a bracket attached to the tank A and provided with a suitable operating-wheel. A pipe $e$, provided with a cock $e'$, extends upwardly from the partition $a$ and leads at its outer end to the gas-mains or gas-holder, if one is used. At its inner end the pipe $e$ is open to the lower compartment $a'$. A branch pipe $f$, having a cock $f'$, connects the gas-pipe $e$ below the cock $e'$ with the interior of the well B.

The well B forms the generator. It is closed by a gas-tight cover $b$, the cover being made hollow and very deep for the purpose of reducing the air-space in the generator. To the top of the cover is attached a cog $g$, which supports at its upper end a funnel $g'$ and is connected at its lower end with a pipe $g^2$ of siphon shape, the shorter leg of which communicates through the wall of the cover with the interior of the generator. Below the cover and slightly above the level of the pipe $f$ a pipe $k$, having a cock $k'$, is attached to the wall of the generator B, communicating with the interior of the same and leading outside of the building in which the generator is located or into a chimney-flue. A bucket or carbid-receptacle H, provided with suitable handles $h$ and having a central water-tight stand-pipe $h'$ and a perforated pipe $h^2$ surrounding the same, is placed in the well B. The carbid is contained in the annular space surrounding the perforated pipe $h^2$.

A glass water-gage is preferably attached to the lower part of the tank A, and another gage may be arranged on the same opposite the upper compartment $a^2$; but the upper compartment is preferably fed from the water-main or from a cistern through a ball-tap, so as to keep the water-level in the compartment $a'$ at a certain height above the top of the pipe $h'$, according to the gas-pressure which it is desired to have in the generator. A sight-glass is arranged in the side of the generator about or just below the level of the pipe $f$.

The operation of the apparatus is as follows: At the start water is supplied to the upper compartment and the lower compartment $a'$ filled from the upper compartment by opening the valve $d'$, the cocks $c'$ and $c^2$ being closed and the cock $e'$ or $f'$ open. When the compartment $a'$ is quite filled, the valve $d'$ is closed. The carbid-receptacle H, with carbid, is then placed into the generator and the cover $b$ of the latter fastened down, suitable packing to make a gas-tight joint being placed between the surfaces. A little water is then poured into the funnel $g'$ until it flows out of the siphon-pipe and trickles upon the carbid, the cock $k'$ being left open during this time. The cock $g$ of the siphon-pipe is now closed. The acetylene generated drives out most of the air in the generator through the air-escape pipe $k$ into the atmosphere, after which the cock $k'$ is closed and the cock $f'$ opened, cock $e'$ being closed at this time. When the cock $c'$ is now opened, water will flow from the compartment $a'$ through the pipe $c$ into the generator B and fill the space about the carbid-receptacle H and rise in the pipe $h'$. The size of the various vessels are so proportioned that the volume of the pipe $h'$ and space around the receptacle H slightly exceed the volume of the compartment $a'$ above the level of the top of the pipe $h'$, so that when the water flows into the generator through the pipe $c$ from the compartment $a'$ while the valve $d'$ is closed it cannot rise above the top of the pipe $h'$. The apparatus is in this condition prepared for generating acetylene. For this purpose the valve $d'$ is opened. The head of water will now cause the water in the pipe $h'$ to overflow. This overflow will immediately run to the bottom of the pipe $h^2$, pass through the perforations of the same, come in contact with the carbid, and start thereby the generation of the gas. If the cock $e'$ is closed, the gas-pressure will force the water back up the tube $d$ and into the compartment $a^2$, and the valve $d'$ may now be fully opened. When the cock $e'$ is opened and the gas drawn off for consumption or into the gas-holder, the pressure in the apparatus will fall and water be again forced over the top of the tube $h'$, so as to generate more gas. If at any time the production of gas exceeds the consumption, the water in the compartment $a'$ and generator B will be forced down again and into the compartment $a^2$, whereby a further supply of water to the carbid is prevented until by the consumption of gas the pressure has again fallen sufficiently for the head of water in the compartment $a^2$ to cause the water to overflow the pipe $h'$. In this way the apparatus automatically regulates the production of acetylene according to its consumption. The exhaustion of the carbid in the bucket is indicated when on closing the cock $e'$ while the water is above the level of the pipe $h'$ the level of the water does not further descend in the compartment $a'$. To remove the exhausted carbid, the cock $c'$ is closed, $f'$ and $e'$ are opened, and water is run into the generator through the funnel $g'$ and siphon-tube $g^2$, so as to drive out the gas remaining in the generator. When the water-level approaches the cock $f'$, which can be observed through the sight-glass $b'$, the cock $f'$ is closed and cock $k'$ opened and the small remainder of gas expelled. The cover $b$ can then be opened without risk or inconvenience, the water drained from the generator B through the cock of the pipe $c^2$, and the carbid-receptacle H lifted out, emptied, and recharged, and inserted again. The cover being closed, a little water is again dropped on the carbid through the funnel and siphon-tube to expel the air, after which the cock $k'$ is closed and $f'$ opened and the apparatus is ready for working, as before described.

Having thus described my invention, I claim as new and desire to secure by Letters Patent—

1. In an acetylene-generating apparatus, the combination of the lower compartment, an upper compartment, a well provided with a tightly-fitting cover, a carbid-receptacle located in the well and provided with a stand-pipe, a pipe connecting the lower compartment with the well below the level of the stand-pipe and provided with a stop-cock, a pipe connecting the upper compartment with the lower compartment below the level of the stand-pipe, a valve for opening and closing said pipe, a gas-pipe connected with the lower compartment above the level of the stand-pipe, a branch pipe connecting the gas-pipe with the well above the level of the stand-pipe and provided with a stop-cock, and a stop-cock in the gas-pipe at a point beyond the branch pipe, substantially as set forth.

2. In an acetylene-generating apparatus, the combination, with a well and a cover fitting tightly on the same, of a carbid-receptacle within the same, means for supplying water to the carbid in the receptacle, means for conducting the generated gas from said well, a siphon-tube attached to the cover of the well for admitting water thereto, and provided with a stop-cock, and an air-escape pipe connected with said well and provided with a stop-cock, substantially as set forth.

3. In an acetylene-generating apparatus, the combination of a lower compartment, an upper compartment, a well provided with a tightly-fitting cover, a carbid-receptacle located in the well and provided with a stand-pipe and a perforated pipe surrounding the same, a pipe connecting the lower compartment and the well at their lower portions and provided with a stop-cock, a branch pipe connected with said pipe and also provided with a stop-cock, a pipe extending from the upper compartment to a point adjacent to the bottom of the lower compartment, a valve for opening and closing said pipe, a gas-pipe extending from the upper part of the lower compartment, a branch pipe connecting said gas-pipe with the well and provided with a stop-cock, and a stop-cock in the gas-pipe at a point beyond the branch pipe, substantially as set forth.

4. In an acetylene-generating apparatus, the combination of a lower compartment, an upper compartment, a well located in said compartments, and provided with a tightly-fitting hollow cover, a carbid-receptacle located in the well and provided with a stand-pipe and a perforated pipe surrounding the same, a pipe connecting the lower compartment and the well at their lower portions and provided with a stop-cock, a branch pipe connected with said pipe and also provided with a stop-cock, a pipe extending from the upper compartment to a point adjacent to the bottom of the lower compartment, a valve for opening and closing said pipe, a gas-pipe extending from the upper part of the lower compartment, a branch pipe connecting said gas-pipe with the well and provided with a stop-cock, a stop-cock in the gas-pipe at a point beyond the branch pipe, a siphon-tube in the hollow cover of the well, communicating with the well and provided with an exterior funnel and a stop-cock, and an air-escape pipe connected with the upper part of the well and provided with a stop-cock, substantially as set forth.

In testimony that I claim the foregoing as my invention I have signed my name in presence of two subscribing witnesses.

EDOUARD HENRIQUEZ.

Witnesses:
GREGORY PHELAN,
MAURICE GERBEAULT.